US008455393B2

(12) United States Patent  
Choi et al.

(10) Patent No.: US 8,455,393 B2  
(45) Date of Patent: Jun. 4, 2013

(54) PREPARATION METHOD FOR GRANULAR CARBON MESOPOROUS STRUCTURE

(75) Inventors: Heechul Choi, Gwangju (KR); Yo Han Kim, Gwangju (KR); Ji Hae Park, Gwangju (KR); Jiyeol Bae, Gwangju (KR); Hosik Park, Gwangju (KR)

(73) Assignee: Gwangju Institute of Science and Technology, Buk-gu, Gwangju (KR)

( * ) Notice: Subject to any disclaimer, the term of this patent is extended or adjusted under 35 U.S.C. 154(b) by 0 days.

(21) Appl. No.: 13/325,987

(22) Filed: Dec. 14, 2011

(65) Prior Publication Data  
US 2013/0096001 A1 Apr. 18, 2013

(30) Foreign Application Priority Data  
Oct. 12, 2011 (KR) .................. 10-2011-0104144

(51) Int. Cl.  
C01B 31/08 (2006.01)

(52) U.S. Cl.  
USPC .................. 502/416; 977/734; 423/445 R

(58) Field of Classification Search  
USPC .................. 423/447.1–447.3, 445 R; 502/416  
See application file for complete search history.

(56) References Cited

U.S. PATENT DOCUMENTS

| 6,024,899 | A | * | 2/2000 | Peng et al. ............... 264/29.1 |
| 2006/0157419 | A1 | * | 7/2006 | Karanfil et al. ............... 210/694 |
| 2008/0152577 | A1 | * | 6/2008 | Addiego et al. ............... 423/460 |

OTHER PUBLICATIONS

Triconstituent Co-assembly to Ordered Mesostructured Polymer-Silica and Carbon-Silica Nanocomposites and Large-Pore Mesoporous Carbons with High Surface Areas Ruili Liu, Yifeng Shi, Ying Wan, , Yan Meng, Fuqiang Zhang, Dong Gu, Zhenxia Chen, Bo Tu, and Dongyuan Zhao Journal of the American Chemical Society 2006 128 (35), 11652-11662.*

Chun Xian Guo, Feng Ping Hu, Xiong Wen Lou, Chang Ming Li, High-performance biofuel cell made with hydrophilic ordered mesoporous carbon as electrode material, Journal of Power Sources, vol. 195, Issue 13, Jul. 1, 2010, pp. 4090-4097, ISSN 0378-7753, 10.1016/j.jpowsour.2010.01.071. (http://www.sciencedirect.com/science/article/pii/S0378775310002.*

* cited by examiner

*Primary Examiner* — Stuart Hendrickson  
*Assistant Examiner* — Richard M Rump  
(74) *Attorney, Agent, or Firm* — Nath, Goldberg & Meyer; Joshua B. Goldberg; Stanley N. Protigal

(57) ABSTRACT

Disclosed is a preparation method for a granular carbon mesoporous structure. The preparation method includes the steps of preparing a powdered composite of silica-carbon precursor-pore forming agent by using a mixture including a silica precursor, a carbon precursor and a pore forming agent, preparing a molded precursor by mixing the composite with an organic additive, preparing a granular molded article by extruding or injection-molding the molded precursor, calcinating the molded article, and etching silica included in the calcinated molded article.

10 Claims, 6 Drawing Sheets

(a)

(b)

(c)

(d)

PREPARATION METHOD FOR GRANULAR CARBON MESOPOROUS STRUCTURE

CROSS-REFERENCE TO RELATED APPLICATION

This application claims the benefit under 35 U.S.C. §119 of Korean Patent Application No. 10-2011-0104144, filed on Oct. 12, 2011 in the Korean Intellectual Property Office, the entirety of which is incorporated herein by reference.

BACKGROUND OF THE INVENTION

1. Field of the Invention

The present invention relates generally to a preparation method for a carbon structure having meso-size pores. More particularly, the present invention relates to a preparation method for a granular carbon mesoporous structure having a reformed surface.

2. Description of the Related Art

In general, activated carbon refers to conventional carbon having fine pores. The activated carbon is prepared by physically or chemically activating raw materials, such as wood, peat, charcoal, brown coal, coconut husk, or petroleum cork. The activated carbon has superior adsorption property, so the activated carbon is extensively used to remove impurities and pollutants from liquid or air. The activated carbon is classified into powdered activated carbon and granular activated carbon. In the case of the powdered activated carbon, dust may be generated or a solution for removing impurities is contaminated by carbon powder during the adsorption process. In order to solve the above problem, the granular activated carbon has been developed and extensively used. However, the granular activated carbon is formed with pores having a small size, so the granular activated carbon may not effectively adsorb impurities and pollutants having various molecular weights, especially, high molecular weight. In addition, since the pore volume is small, the amount of pollutants adsorbed by the granular activated carbon may be limited, and the pollutants may not be readily discharged through the small-size pores when the granular activated carbon is reproduced, so the granular activated carbon may not be reused. For this reason, a carbon mesoporous structure has been spotlighted as a substitute of the granular activated carbon.

A mesopore refers to a pore having a size in the range of about 2 nm to 50 nm. A carbon material having such a mesopore represents superior effects as compared with the conventional powdered or granular activated carbon. First, the mesoporous carbon is formed with pores larger than pores of the activated carbon, so the mesoporous carbon can adsorb materials having various molecular weights. In addition, since the mesoporous carbon has a relatively large pore volume, time to reach the adsorption equilibrium may be shortened, so the size of the adsorbent can be diminished and the economic efficiency can be improved. Further, materials adhering to the mesopores may be readily detached from the mesopores as compared with the conventional activated carbon, so it may be possible to reproduce or reuse the mesoporous carbon. Thus, the life span and the economic efficiency of the adsorbent can be improved.

Although the mesoporous carbon has the above advantages, the mesoporous carbon has not been commonly used yet due to the expensive synthesizing cost and difficulty of mass production. In addition, since the carbon mesoporous material is synthesized in the form of powder, there is limitation to remove impurities from liquid and dust may be generated when the carbon mesoporous material is used to remove impurities from air. Thus, it is very difficult to apply the carbon mesoporous material in the field.

To realize the common use of the carbon mesoporous material, it is necessary to develop a preparation method for the carbon mesoporous material, which can be applied to both liquid and air and can reduce the synthesizing cost and process steps. However, the method for solving the above problems has not been suggested yet.

SUMMARY OF THE INVENTION

Accordingly, the present invention has been made keeping in mind the above problems occurring in the prior art, and an object of the present invention is to provide a preparation method for a granular carbon mesoporous structure, which can be applied to both liquid and air and can simplify the synthesizing process and reduce the synthesizing cost.

To accomplish the above object, according to one aspect of the present invention, there is provided a preparation method for a granular carbon mesoporous structure, which includes the steps of preparing a powdered composite of silica-carbon precursor-pore forming agent by using a mixture including a silica precursor, a carbon precursor and a pore forming agent, preparing a molded precursor by mixing the composite with an organic additive, preparing a granular molded article by extruding or injection-molding the molded precursor, calcinating the molded article, and etching silica included in the calcinated molded article.

According to another aspect of the present invention, there is provided a preparation method for a granular carbon mesoporous structure, which includes the steps of preparing a powdered composite of silica-carbon precursor-pore forming agent by using a mixture including a silica precursor, a carbon precursor and a pore forming agent, preparing a molded precursor by mixing the composite with an organic additive, preparing a granular molded article by extruding or injection-molding the molded precursor, primarily calcinating the molded article, etching silica included in the calcinated molded article, and secondarily calcinating the molded article where the silica has been etched.

According to still another aspect of the present invention, there is provided a granular carbon mesoporous structure prepared through the above methods.

According to the preparation method for the granular carbon mesoporous structure of the present invention, the granular carbon mesoporous structure having the porosity similar to that of a powdered carbon mesoporous structure can be prepared through one calcination process, so the synthesizing process can be simplified and the synthesizing cost can be reduced. In addition, the granular carbon mesoporous structure prepared through the preparation method according to the present invention can be present in a granular form, so dust may not be generated when the granular carbon mesoporous structure is used to remove pollutants from air, and the granular carbon mesoporous structure is also applicable for removing pollutants from liquid.

The effects of the present invention may not be limited to the above effects, and other effects of the present invention may be comprehended to those skilled in the art from the following description.

BRIEF DESCRIPTION OF THE DRAWINGS

FIGS. 2a to 2d are schematic views showing the concept of the preparation method for the granular carbon mesoporous structure according to one embodiment of the present invention, in which FIG. 2a is an example of a powdered composite of silica-carbon precursor-pore forming agent, FIG. 2b is an example of a granular molded article, FIG. 2c is an example of a calcinated molded article, and FIG. 2d is an example of a granular carbon mesoporous structure prepared by removing a template;

FIGS. 4a to 4c are photographic views showing the granular carbon mesoporous structure prepared according to embodiments of the present invention, in which FIG. 4a shows the granular carbon mesoporous structure prepared by using PVA (polyvinyl alcohol) as an organic binder, FIG. 4b shows the granular carbon mesoporous structure prepared by using CMC (carboxymethyl cellulose sodium salt) as an organic binder, and FIG. 4c shows the granular carbon mesoporous structure prepared by using MCe (microcrystalline cellulose) as an organic binder.

DETAILED DESCRIPTION OF THE INVENTION

Figure 1:
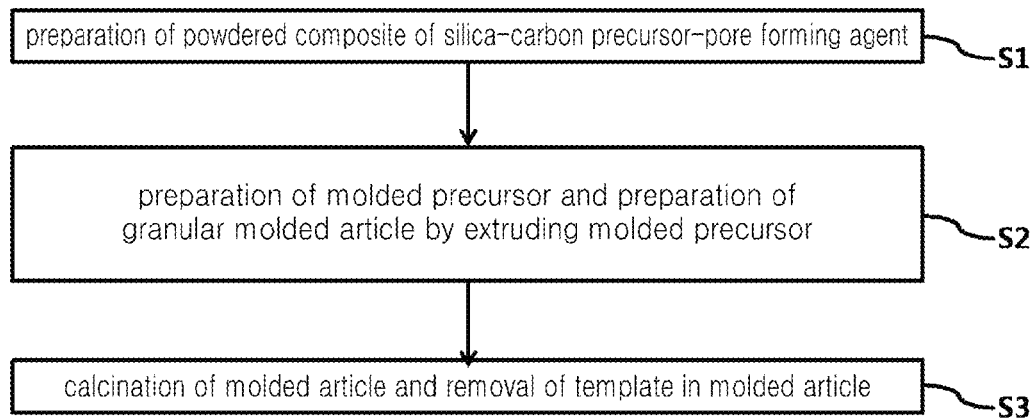
FIG. 1 is a flowchart showing a preparation method for the granular carbon mesoporous structure according to one embodiment of the present invention.

Hereinafter, exemplary embodiments of the present invention will be described with reference to accompanying drawings. The present invention is not limited to the following embodiments, but can be embodied in various forms and includes various equivalents and substitutes within the technical scope of the present invention. The thickness of layers and regions in the drawings may be exaggerated for the purpose of clarity and the same reference numerals will be used to refer to the same elements throughout the specification. If it is determined that description about well known functions or configurations may make the subject matter of the present invention unclear, the details thereof will be omitted.

According to one aspect of the present invention, there is provided a preparation method for a granular carbon mesoporous structure. The preparation method includes the steps of preparing a powdered composite of silica-carbon precursor-pore forming agent by using a mixture including a silica precursor, a carbon precursor and a pore forming agent, preparing a molded precursor by mixing the composite with an organic additive, preparing a granular molded article by extruding or injection-molding the molded precursor, calcinating the molded article, and etching silica included in the calcinated molded article.

FIG. 1 is a flowchart showing a preparation method for the granular carbon mesoporous structure according to one embodiment of the present invention, and FIGS. 2a to 2d are schematic views showing the concept of the preparation method for the granular carbon mesoporous structure according to one embodiment of the present invention.

Referring to FIG. 1, the preparation method for the granular carbon mesoporous structure according to one embodiment of the present invention mainly includes the steps of ① preparing a powdered composite of silica-carbon precursor-pore forming agent (S1), ② preparing a granular molded article from the powdered composite of silica-carbon precursor-pore forming agent (S2), and ③ calcinating the molded article and removing a template (S3). Hereinafter, the concept of the preparation method for the granular carbon mesoporous structure according to one embodiment of the present invention will be described with reference to FIGS. 2a to 2d.

Figure 2:
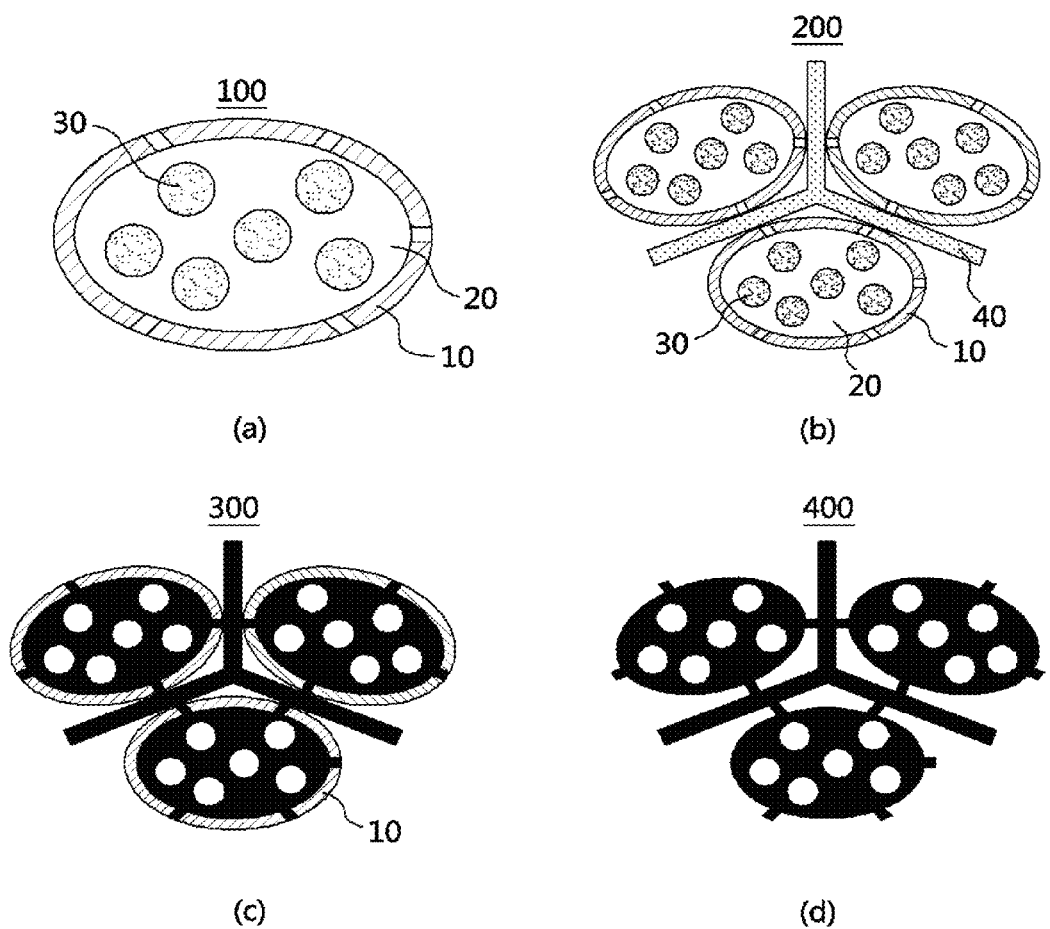

FIG. 2a is an example of a powdered composite of silica-carbon precursor-pore forming agent. Referring to FIG. 2a, the powdered composite 100 of silica-carbon precursor-pore forming agent is prepared by mixing a silica precursor, a carbon precursor and a pore forming agent. First, a silica precursor is synthesized into a network-shape mesoporous silica material 10 through the hydration and condensation reaction. A carbon precursor 20 and a pore forming agent 30 flowing into pores of the mesoporous silica material 10 serving as a template are distributed according to the chemical properties thereof. That is, hydrophilic portions of the carbon precursor 20 make contact with the mesoporous silica material 10 and hydrophobic portions of the carbon precursor 20 make contact with the pore forming agent 30, respectively, so that the powdered composite 100 of silica-carbon precursor-pore forming agent can be prepared.

FIG. 2b is an example of a granular molded article. Referring to FIG. 2b, the granular molded article 200 can be prepared by combining a plurality of powdered composites 100 of silica-carbon precursor-pore forming agent with each other using an organic binder 40. That is, the powdered composites 100 of silica-carbon precursor-pore forming agent are combined with each other while being extruded or injection-molded, so that the powdered composite is granulized.

FIG. 2c is an example of a calcinated molded article 300 and FIG. 2d is an example of a granular carbon mesoporous structure 400 prepared by removing the template. Referring to FIGS. 2c and 2d, the pore forming agent 30 is removed as the molded precursor 200 is calcinated, and the carbon precursor 20 and the organic binder 40 are carbonized. The mesoporous silica material 10 serving as the template is removed from the calcinated molded article 300, so that the granular carbon mesoporous structure 400 is prepared.

Hereinafter, definition of terms used in the present invention will be described.

Unless explained otherwise, the term 'silica' refers to the mesoporous silica material 10 prepared through the hydration and condensation reaction of the silica precursor.

In addition, unless explained otherwise, the term 'composite of silica-carbon precursor-pore forming agent' or 'composite' refers to a powdered material, which is prepared by distributing the carbon precursor 20 and the pore forming agent 30 in the mesoporous silica material 10 serving as a template according to the chemical properties thereof, that is, refers to a unit material for the mesoporous carbon structure to be granulized.

Further, unless explained otherwise, the term 'granular molded article' refers to a granular material prepared by combining a plurality of composites 100 of silica-carbon precursor-pore forming agent with each other using the organic binder 40, that is, refers to a material containing the pore forming agent 30 and the mesoporous silica material 10.

In addition, unless explained otherwise, the term 'calcination' and 'primary calcination' refer to the process for removing the pore forming agent 30 and carbonizing the carbon precursor 20 and the organic binder 40 by applying heat.

Further, unless explained otherwise, the term 'etching' refers to the process for selectively removing the mesoporous silica material 10 serving as the template for the carbon precursor 20.

In addition, unless explained otherwise, the term 'secondary calcination' refers to the process for reforming the carbon surface of the structure by applying high-temperature heat to the granular carbon mesoporous structure where the mesoporous silica material 10 serving as the template has been completely removed.

The preparation method for the granular carbon mesoporous structure according to the present invention includes the steps of 1) preparing a powdered composite of silica-carbon precursor-pore forming agent by using a mixture including a silica precursor, a carbon precursor and a pore forming agent, 2) preparing a molded precursor by mixing the composite with an organic additive, 3) preparing a granular molded article by extruding or injection-molding the molded precursor, 4) calcinating the molded article, and 5) etching silica included in the calcinated molded article.

The silica precursor used in step 1) is a material to be synthesized into silica serving as a template when the carbon precursor is formed into the mesoporous structure, and the silica precursor is synthesized into the silica through the hydration and condensation reaction. The silica precursor may include one or at least two selected from the group consisting of tetraethyl orthosilicate (TEOS), tetramethyl orthosilicate (TMOS), tetrapropoxysilane (TPOS), tetrabutoxysiline (TBOS), sodium silicate, fumed silica, and colloidal silica. In particular, the silica precursor preferably includes TEOS or sodium silicate.

The carbon precursor used in step 1) is carbonized to serve as a source of carbon that constitutes the granular carbon mesoporous structure, that is, the final product. The carbon precursor may include at least one selected from the group consisting of an alcohol group, such as glucose, sucrose, xylose, phenol, furfuryl alcohol, ethyl alcohol, resorcinol and phloroglucinol, furfural, phenolic resin, mesophase pitch, acetylene, propylene, ethylene, acenaphthene, pyrene, polyacrylonitrile, anthracene, benzene, acetonitrile, polyvinylchloride, resol, formaldehyde, turanose, raffinose, and organic surfactant. Preferably, the carbon precursor includes resol or organic surfactant.

The pore forming agent used in step 1) is a material to form meso-size pores in the carbon precursor material when the carbon precursor is distributed in the silica serving as the template to form the composite of the silica-carbon precursor-pore forming agent. The pore forming agent may include at least one selected from the group consisting of trialkylbenzene, butanol, pentanol, hexanol, p-xylene, hexadecane, butylacetate, octane and N,N-dimethylformamide (DMF). Preferably, the pore forming agent includes trimethylbenzene (TMB).

In order to prepare the powdered composite of silica-carbon precursor-pore forming agent used in step 1), the carbon precursor and the pore forming agent are mixed and stirred in an acidic solvent to form a composite of silica-carbon precursor-pore forming agent and then the composite is dried. Various types of solvents can be employed if they can uniformly distribute the carbon precursor. The acidic solvent is preferable to promote the hydration and condensation reaction of the silica precursor. The acidic condition can be achieved by dissolving organic acid or inorganic acid. In detail, sulfuric acid, nitric acid, hydrochloric acid, phosphoric acid, or paratoluene sulfuric acid can be employed as the organic acid or inorganic acid. The stirring process is performed at least one time at the temperature in the range of 50° C. to 200° C. to form the composite of silica-carbon precursor-pore forming agent. If the stirring process is performed at least two times, the stirring condition may be changed whenever the stirring process is performed. According to the embodiment of the present invention, TEOS, P123 and TMB are dissolved in a hydrochloric acid aqueous solution and stirred for 20 hours at the temperature of 40° C., and then dried. After that, a sulfuric acid aqueous solution is added and the mixture is stirred for 30 minutes at the normal temperature and then dried, thereby preparing the composite of silica-carbon precursor-pore forming agent.

The organic binder used in step 2) is a binder to combine the powdered composites of silica-carbon precursor-pore forming agent with each other and is carbonized in the calcination process to serve as a source of carbon that constitutes the granular carbon mesoporous structure, that is, the final product. The organic binder may include at least one selected from the group consisting of PVA (polyvinyl alcohol), CMC (carboxymethyl cellulose sodium salt) and MCe (microcrystalline cellulose). Preferably, the amount of the organic binder is 20 weight parts to 30 weight parts based on 100 weight parts of the composite of silica-carbon precursor-pore forming agent. If the amount of the organic binder is less than 20 weight parts, the granular precursors may not be combined well, so the granulation efficiency is lowered. In addition, if the amount of the organic binder exceeds 30 weight parts, cohesion is severe between organic binders, so the granulation efficiency is lowered. According to the embodiment of the present invention, 20 weight parts to 30 weight parts of the PVA, CMC and MCe are mixed with each other to prepare the granular carbon mesoporous structure.

The granular molded precursor used in step 2) can be prepared by mixing and stirring the composite of silica-carbon precursor-pore forming agent and the organic binder in the solvent. At this time, the composite of silica-carbon precursor-pore forming agent contains the silica and the pore forming agent. The silica and the pore forming agent contained in the composite of silica-carbon precursor-pore forming agent prevent the pores from being occluded when the composites of silica-carbon precursor-pore forming agent are combined with each other into the granular shape by the organic binder. In detail, if the materials where the silica and the pore forming agent are removed are combined with each other, the pores generated by the pore forming agent may be occluded by the organic binder. In order to solve the above problem, the present invention employs the composite containing the silica and the pore forming agent.

Figure 3:
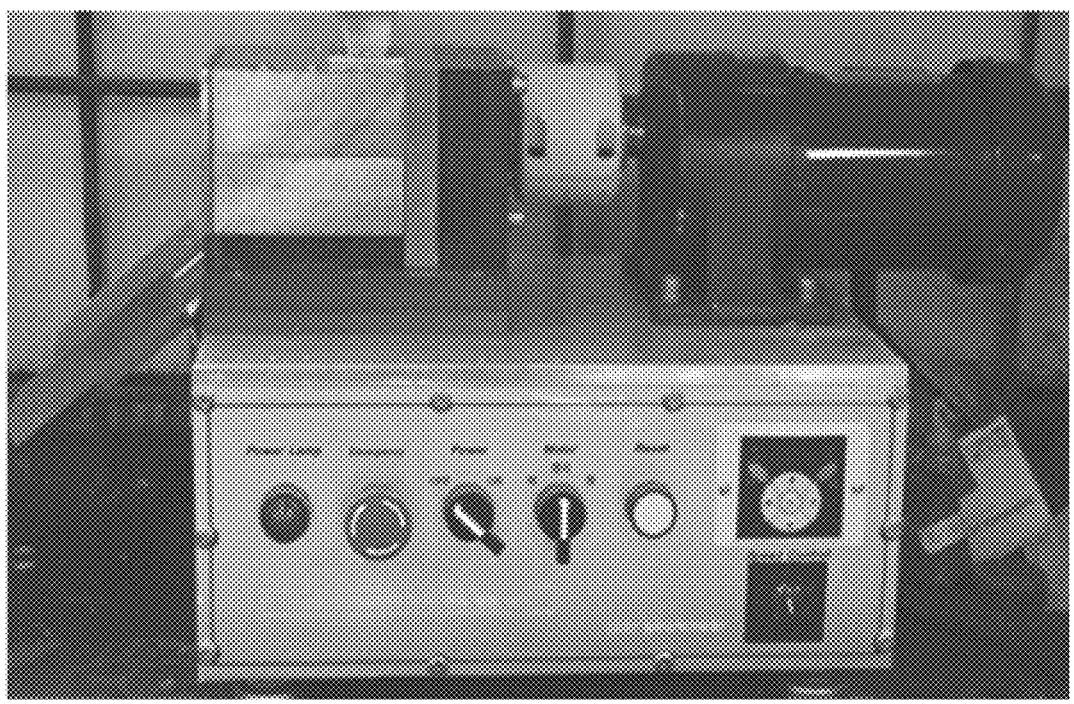
FIG. 3 is a photographic view showing an extruder used in a preparation method for the granular carbon mesoporous structure according to one embodiment of the present invention.
Figure 4A:
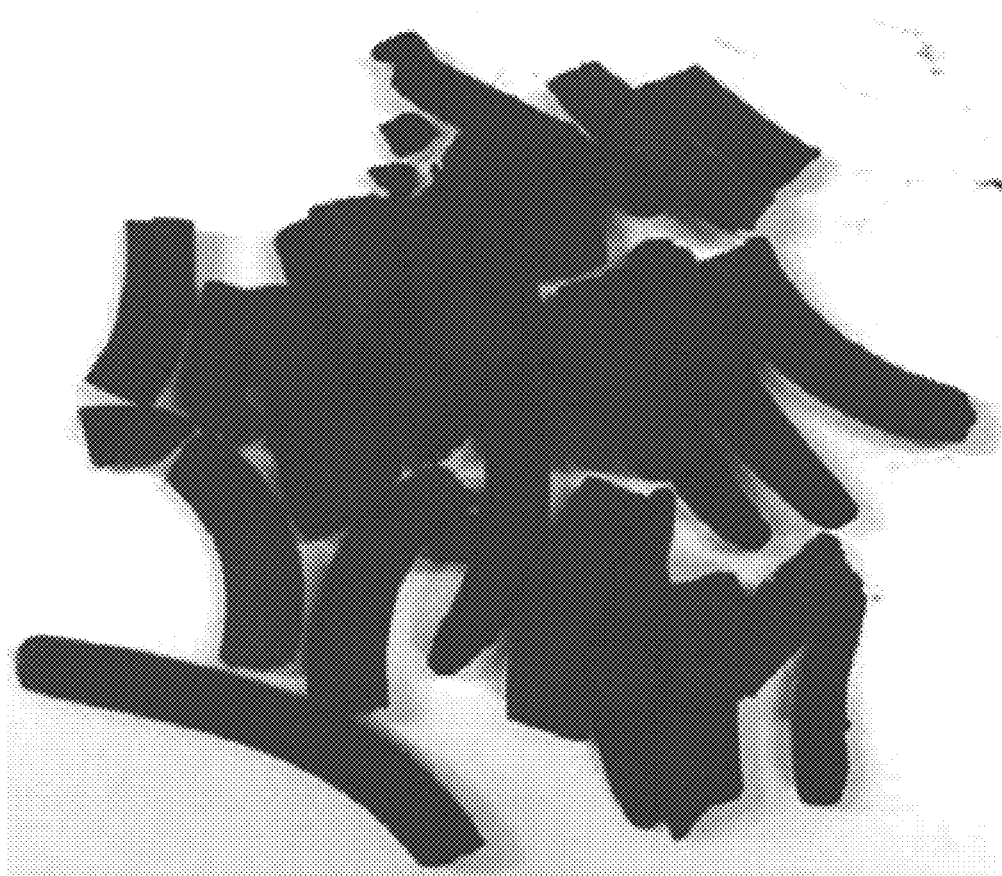
Figure 4B:
Figure 4C:

The molded precursor used in step 3) is extruded or injection-molded to form the granular molded article. That is, when the molded precursor is extruded or injection-molded, the pressure is applied to the molded precursor, so the contact frequency and the contact area between the organic binder and the composite may be increased, thereby promoting the granulation. In addition, the molded precursor can be prepared in various forms through the extrusion or the injection molding. Thus, the granular carbon mesoporous structure, that is, the final product can be prepared in various forms, such as a pallet, a stack and a plate. As a result, the granular carbon mesoporous structure can be applied to various pollutant treatment systems, so the application of the granular carbon mesoporous structure may be improved. According to the embodiment of the present invention, a linear molded article is prepared by using the extruder as shown in FIG. 3.

The calcination process in step 4) can be performed at the temperature in the range of about 500° C. to about 1200° C. in the non-oxidizing atmosphere. In the calcination process, the pore forming agent contained in the molded article is removed and the carbon precursor and the organic binder are carbonized. The non-oxidizing atmosphere may be a vacuum atmosphere, a nitride gas atmosphere, or an inert gas atmosphere. In addition, the calcination temperature is preferably in the range of about 500° C. to about 1200° C. If the calcination temperature is less than 500° C., the carbon precursor and the organic binder may be incompletely carbonized. In addition, if the calcination temperature exceeds 1200° C., the structure of the silica serving as the template may be deformed. According to the embodiment of the present invention, the calcination process is performed at the temperature of 900° C. in the nitride gas atmosphere to prepare the granular carbon mesoporous structure.

The etching process in step 5) can be performed by applying the solvent capable of selectively dissolving the silica to the calcinated molded article. The solvent may include hydrofluoric acid, sodium hydroxide, or potassium hydroxide. Preferably, the solvent includes the hydrofluoric acid. At this time, concentration of the hydrofluoric acid is in the range of 5 wt % to 50 wt %. Due to the solvent, the silica is converted into soluble silicate through alkali fusion or carbonate fusion. In addition, the silica reacts with hydrofluoric acid to form corrosive $SiF_4$ so that the silica is removed.

According to another aspect of the present invention, the preparation method for the granular carbon mesoporous structure includes the steps of 1) preparing a powdered composite of silica-carbon precursor-pore forming agent by using a mixture including a silica precursor, a carbon precursor and a pore forming agent, 2) preparing a molded precursor by mixing the composite with an organic additive, 3) preparing a granular molded article by extruding or injection-molding the molded precursor, 4) primarily calcinating the molded article, 5) etching silica included in the calcinated molded article, and 6) secondarily calcinating the molded article where the silica has been etched.

Steps 1) to 5 of the preparation method for the granular carbon mesoporous structure are substantially identical to steps 1) to 5) or the previous embodiment, so detailed description thereof will be omitted and the following description will be made while focusing on step 6).

In step 6), the secondary calcination process is performed at the temperature in the range of about 500° C. to about 1200° C. in the non-oxidizing atmosphere. In the secondary calcination process, the carbon surface of the molded article where the silica has been etched is reformed. The non-oxidizing atmosphere may be a vacuum atmosphere, a nitride gas atmosphere, or an inert gas atmosphere. In addition, the calcination temperature is preferably in the range of about 500° C. to about 1200° C. If the calcination temperature is less than 500° C., the reforming efficiency for the carbon surface may be degraded. In addition, if the calcination temperature exceeds 1200° C., the strength of the structure may be lowered. According to the embodiment of the present invention, the secondary calcination process is performed at the temperature of 900° C. in a helium gas atmosphere to reform the surface of the granular carbon mesoporous structure. Through the secondary calcination process, the surface of the granular carbon mesoporous structure can be reformed so that the adsorption property thereof can be more improved.

In addition, according to still another aspect of the present invention, there is provided the granular carbon mesoporous structure prepared through the above method.

Preferably, the granular carbon mesoporous structure has the mean pore diameter of about 5 nm to about 11 nm, and the specific surface of about 700 $m^2/g$ to about 1400 $m^2/g$. The granular carbon mesoporous structure may have the pore characteristics similar to the pore characteristics of the powdered carbon mesoporous structure, so that the granular carbon mesoporous structure may have the adsorption property similar to the adsorption property of the powdered adsorbent. Thus, the granular carbon mesoporous structure can be applied to various fields, such as water treatment, air pollutant treatment, and gas storage.

Hereinafter, the exemplary embodiments of the present invention will be described such that those skilled in the art can comprehend the present invention. However, these exemplary embodiments are illustrative purpose only and the present invention is not limited thereto.

Embodiment 1

Preparation of Granular Carbon Mesoporous Structure

<1-1> Preparation of Powdered Composite of Silica-Carbon Precursor-Pore Forming Agent In order to prepare the powdered composite of silica-carbon precursor-pore forming agent, a mixed solution was prepared by adding 257 Ml of TEOS (silica precursor), 140 g of pluronic P123 (carbon precursor), and 120 Ml of TMB (pore forming agent) to a hydrofluoric acid aqueous solution (pH 1-3). Then, 200 g to 300 g of powder was obtained by stirring the mixed solution for 20 hours at the temperature of 40° C. and then drying the mixed solution. Then, the powder was added to a sulfuric acid aqueous solution (4 Ml of water and 0.08 Ml of sulfuric acid per 1 g of powder). After that, the mixture was dried for 12 hours at the temperature of 100° C. and then dried for 12 hours at the temperature of 160° C., thereby obtaining the powdered composite of silica-carbon precursor-pore forming agent.

<1-2> Preparation of Powdered Carbon Mesoporous Structure

The powdered composite of silica-carbon precursor-pore forming agent prepared in embodiment <1-1> was calcinated for 3 hours at the temperature of 900° C. in the nitrogen gas atmosphere without granulating the powdered composite to remove TMB and to carbonize pluronic P123.

Then, a hydrofluoric acid solution, which was prepared by adding 10 wt % of hydrofluoric acid liquid to a solution including distilled water and ethanol in a ratio of 1:1, was applied to the calcinated precursor to remove TEOS, thereby preparing the powdered carbon mesoporous structure used as a control group.

<1-3> Preparation of Granular Carbon Mesoporous Structure 20 wt % (first experimental group) and 30 wt % (second experimental group) of the organic binders (PVA, CMC and MCe: 8 g for first experimental group and 12 g for second experimental group) were added to 40 g of the powdered composite of silica-carbon precursor-pore forming agent prepared in embodiment <1-1>, respectively. Then, the mixture was sufficiently stirred for 10 minutes to 20 minutes at the normal temperature by using a mixer. After that, 20 Ml to 30 Ml of distilled water was added to the mixture and then the mixture was stirred for 10 minutes to 20 minutes at the normal temperature by using the mixer, thereby obtaining the molded precursor.

The molded precursor was extruded by using an extruder as shown in FIG. 3 (twin extruder type catalyst extruder available from ENTEC Inc.), thereby obtaining the granular molded precursor. The granular molded precursor was calcinated for 3 hours at the temperature of 900° C. in the nitrogen gas atmosphere to remove TMB and to carbonize pluronic P123 and the organic binders (PVA, CMC and MCe).

Then, a hydrofluoric acid solution, which was prepared by adding 10 wt % of hydrofluoric acid liquid to a solution including distilled water and ethanol in a ratio of 1:1, was applied to the calcinated molded article to remove TEOS, thereby finally preparing the granular carbon mesoporous structure.

<1-4> Analysis for Powdered and Granular Carbon Mesoporous Structures

The physical pore characteristics of the powdered carbon mesoporous structure and the granular carbon mesoporous structure prepared in embodiments <1-2> and <1-3>, respectively, were compared/analyzed and the result is represented below in Tables 1 and 2.

TABLE 1

|  | BET specific surface area ($m^2/g$) | Pore volume ($cm^3/g$) | Mean pore size (nm) |
|---|---|---|---|
| powdered carbon mesoporous structure | 927.83 | 1.33 | 6.3 |

TABLE 2

|  | Organic binder | BET specific surface area ($m^2/g$) | Pore volume ($cm^3/g$) | Mean pore size (nm) |
|---|---|---|---|---|
| First experimental group | PVA | 959.79 | 2.02 | 8.4 |
|  | CMC | 722.37 | 1.37 | 7.6 |
|  | MCe | 872.70 | 1.71 | 7.8 |
| Second experimental group | PVA | 900.84 | 1.90 | 8.4 |
|  | CMC | 680.89 | 1.32 | 7.7 |
|  | MCe | 738.79 | 1.28 | 6.9 |

As can be understood from the above result, the granular carbon mesoporous structure prepared according to the present invention represents the pore characteristics similar to the pore characteristics of the powdered carbon mesoporous structure.

Embodiment 2

Analysis for Surface Reform and Pore Characteristics of Granular Mesoporous Structure The granular carbon mesoporous structure prepared in embodiment <1-3> was dried at the temperature of 100° C. and then secondarily calcinated for 3 hours at the temperature of 900° C., thereby reforming the surface of the granular carbon mesoporous structure. Physical pore characteristics of the granular carbon mesoporous structure having the reformed surface were analyzed and the result is shown below in Table 3.

TABLE 3

|  | Organic binder | BET specific surface area ($m^2/g$) | Pore volume ($cm^3/g$) | Mean pore size (nm) |
|---|---|---|---|---|
| First experimental group | PVA | 1379.28 | 2.49 | 7.2 |
|  | CMC | 1480.78 | 2.42 | 6.6 |
|  | MCe | 998.10 | 1.84 | 7.4 |
| Second experimental group | PVA | 1129.25 | 2.11 | 7.4 |
|  | CMC | 1442.67 | 2.38 | 6.6 |
|  | MCe | 994.50 | 1.46 | 5.9 |

As can be understood from the above result, if the surface of the granular carbon mesoporous structure is reformed through the secondary calcination process, the pore characteristics can be remarkably improved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A preparation method for a granular carbon mesoporous structure, the preparation method comprising:
   preparing a powdered composite of silica-carbon precursor-pore forming agent by using a mixture including a silica precursor, a carbon precursor and a pore forming agent;
   preparing a molded precursor by mixing the composite with an organic additive;
   preparing a granular molded article by extruding or injection-molding the molded precursor;
   primarily calcinating the molded article;
   etching silica included in the calcinated molded article; and
   secondarily calcinating the molded article where the silica has been etched.

2. The preparation method of claim 1, wherein the silica precursor includes at least one selected from the group consisting of tetraethyl orthosilicate (TEOS), tetramethyl orthosilicate (TMOS), tetrapropoxysilane (TPOS), tetrabutoxysiline (TBOS), sodium silicate, fumed silica, and colloidal silica.

3. The preparation method of claim 1, wherein the carbon precursor includes at least one selected from the group consisting of glucose, sucrose, xylose, phenol, furfuryl alcohol, ethyl alcohol, resorcinol, phloroglucinol, furfural, phenolic resin, mesophase pitch, acetylene, propylene, ethylene, acenaphthene, pyrene, polyacrylonitrile, anthracene, benzene, acetonitrile, polyvinylchloride, resol, formaldehyde, turanose, raffinose, and organic surfactant.

4. The preparation method of claim 1, wherein the pore forming agent includes at least one selected from the group consisting of trialkylbenzene, butanol, pentanol, hexanol, p-xylene, hexadecane, butylacetate, octane and N,N-dimethylformamide (DMF).

5. The preparation method of claim 1, wherein the powdered composite of silica-carbon precursor-pore forming agent is prepared by mixing and stirring the silica precursor, the carbon precursor and the pore forming agent in an acidic solvent and drying the mixture.

6. The preparation method of claim 1, wherein the powdered composite of silica-carbon precursor-pore forming agent is prepared without removing the silica and the pore forming agent therefrom.

7. The preparation method of claim 1, wherein the organic additive includes at least one selected from the group consisting of PVA, CMC and MCe.

8. The preparation method of claim 1, wherein an amount of the organic additive is 20 weight parts to 30 weight parts based on 100 weight parts of the powdered composite of silica-carbon precursor-pore forming agent.

9. The preparation method of claim 1, wherein the primary calcination is performed at a temperature of 500° C. to 1200° C. in a non-oxidizing atmosphere to remove the pore forming agent and to carbonize the carbon precursor and the organic binder.

10. The preparation method of claim 1, wherein the secondary calcination is performed at a temperature of 500° C. to 1200° C. in a non-oxidizing atmosphere to reform a surface of the molded article where the silica has been etched.

* * * * *